United States Patent [19]
Smithson

[11] Patent Number: 6,089,606
[45] Date of Patent: Jul. 18, 2000

[54] CLAMPING WEDGE FOR SEAT BELT WEBBING HAVING A RANDOM ARRAY OF TEETH

[75] Inventor: Alan George Smithson, Wetheral, United Kingdom

[73] Assignee: Breed Automotive Technology, Inc., Lakeland, Fla.

[21] Appl. No.: 08/952,306

[22] PCT Filed: May 15, 1996

[86] PCT No.: PCT/GB96/01161

§ 371 Date: Nov. 14, 1997

§ 102(e) Date: Nov. 14, 1997

[87] PCT Pub. No.: WO96/36510

PCT Pub. Date: Nov. 21, 1996

[30] Foreign Application Priority Data

May 15, 1995 [GB] United Kingdom ................. 96 09 767

[51] Int. Cl.[7] .................................................. B60R 22/36
[52] U.S. Cl. ...................................... 280/806; 242/381.1
[58] Field of Search ..................... 280/806, 807; 297/476, 478, 479, 480; 242/381.1, 381.3, 381.4; 24/194; 188/65.1, 250 B

[56] References Cited

U.S. PATENT DOCUMENTS

| | | | |
|---|---|---|---|
| 3,494,571 | 2/1970 | Stoffel | 242/381.1 |
| 3,814,346 | 6/1974 | Carter | 242/381.1 |
| 4,934,030 | 6/1990 | Spinosa et al. | 24/194 |
| 4,938,431 | 7/1990 | Smithson | 242/381.1 |
| 5,029,896 | 7/1991 | Ernst | 280/806 |
| 5,358,276 | 10/1994 | Lane, Jr. | 280/806 |
| 5,566,899 | 10/1996 | Sasaki et al. | 242/381.1 |

FOREIGN PATENT DOCUMENTS

| | | |
|---|---|---|
| 0 289 320 A1 | 11/1988 | European Pat. Off. . |
| 0 331 119 A2 | 9/1989 | European Pat. Off. . |
| 34 21 837 A1 | 12/1985 | Germany . |
| 34 23 382 A1 | 3/1986 | Germany . |
| 35 13 113 A1 | 10/1986 | Germany . |
| 36 13 430 A1 | 10/1987 | Germany . |
| 37 37 684 A1 | 5/1989 | Germany . |

*Primary Examiner*—J. J. Swann
*Assistant Examiner*—David R. Dunn
*Attorney, Agent, or Firm*—Markell Seitzman

[57] ABSTRACT

One or more clamping wedges preferably for use with a web locking seat belt retractor, including a clamping surface associated with each wedge, having a plurality of individual teeth arranged in a random array on at least a substantial part of the clamping wedge.

15 Claims, 5 Drawing Sheets

DESIGN CALCULATIONS FOR RANDOM WEDGE TOOTH ARRAY (WL9E)
INPUT PARAMETERS

MAX X VALUE  X: = 22     MAX Y VALUE  Y: = 14.5

$i: = 1....35$     $j: = 36....70$     $k: = 71....105$     $l: = 106....140$     $m: = 141....175$
$x_i: = rnd(X)$    $x_j: = rnd(X)$     $x_k: = rnd(X)$      $x_l: = rnd(X)$       $x_m: = rnd(X)$
$y_i: = rnd(Y)$    $y_j: = rnd(Y)$     $y_k: = rnd(Y)$      $y_l: = rnd(Y)$       $y_m: = rnd(Y)$

| i | $x_i$ | $y_i$ | j | $x_j$ | $y_j$ | k | $x_k$ | $y_k$ | l | $x_l$ | $y_l$ | m | $x_m$ | $y_m$ |
|---|---|---|---|---|---|---|---|---|---|---|---|---|---|---|
| 1 | 0.028 | 2.754 | 36 | 18.427 | 7.904 | 71 | 13.3 | 11.951 | 106 | 9.283 | 2.53 | 141 | 8.231 | 1.476 |
| 2 | 4.253 | 2.586 | 37 | 10.668 | 5.93 | 72 | 7.948 | 3.937 | 107 | 13.287 | 13.966 | 142 | 18.756 | 1.403 |
| 3 | 12.87 | 6.633 | 38 | 16.362 | 6.751 | 73 | 21.472 | 12.621 | 108 | 9.116 | 2.865 | 143 | 16.359 | 2.347 |
| 4 | 7.707 | 1.414 | 39 | 10.075 | 2.214 | 74 | 19.707 | 14.076 | 109 | 13.709 | 0.686 | 144 | 5.184 | 9.726 |
| 5 | 18.102 | 1.369 | 40 | 16.377 | 10.701 | 75 | 20.977 | 3.2 | 110 | 0.107 | 0.523 | 145 | 17.241 | 12.879 |
| 6 | 3.831 | 13.507 | 41 | 13.179 | 11.987 | 76 | 4.437 | 2.967 | 111 | 8.677 | 1.195 | 146 | 12.391 | 8.258 |
| 7 | 15.631 | 12.972 | 42 | 16.17 | 12.663 | 77 | 7.82 | 2.797 | 112 | 6.97 | 8.25 | 147 | 2.734 | 1.616 |
| 8 | 6.688 | 3.296 | 43 | 12.593 | 4.351 | 78 | 6.402 | 13.873 | 113 | 18.777 | 3.174 | 148 | 9.104 | 10.635 |
| 9 | 2.011 | 5.955 | 44 | 3.534 | 1.845 | 79 | 2.191 | 10.712 | 114 | 4.349 | 4.417 | 149 | 3.761 | 7.074 |
| 10 | 3.241 | 9.107 | 45 | 9.354 | 11.382 | 80 | 15.606 | 9.858 | 115 | 10.32 | 5.963 | 150 | 5.308 | 11.617 |
| 11 | 21.747 | 6.548 | 46 | 11.377 | 8.84 | 81 | 14.781 | 13.359 | 116 | 9.531 | 3.65 | 151 | 4.952 | 5.054 |
| 12 | 2.62 | 8.669 | 47 | 16.534 | 1.048 | 82 | 0.127 | 12.242 | 117 | 9.213 | 7.377 | 152 | 15.365 | 14.478 |
| 13 | 0.196 | 12.394 | 48 | 3.718 | 9.481 | 83 | 13.302 | 1.529 | 118 | 12.77 | 14.325 | 153 | 14.153 | 13.746 |
| 14 | 11.697 | 9.059 | 49 | 10.821 | 1.52 | 84 | 6.394 | 13.104 | 119 | 7.423 | 1.765 | 154 | 7.25 | 9.139 |
| 15 | 13.239 | 8.203 | 50 | 15.395 | 3.293 | 85 | 16.432 | 12.945 | 120 | 20.923 | 10.251 | 155 | 7.055 | 2.111 |
| 16 | 3.657 | 2.672 | 51 | 3.245 | 13.34 | 86 | 20.069 | 13.872 | 121 | 9.209 | 4.274 | 156 | 3.585 | 6.64 |
| 17 | 9.917 | 8.05 | 52 | 3.115 | 9.61 | 87 | 13.33 | 4.806 | 122 | 17.088 | 7.614 | 157 | 6.082 | 0.706 |
| 18 | 1.255 | 3.522 | 53 | 15.243 | 7.142 | 88 | 17.253 | 12.869 | 123 | 3.326 | 7.5 | 158 | 5.197 | 10.764 |
| 19 | 17.233 | 8.769 | 54 | 9.384 | 7.204 | 89 | 11.938 | 6.283 | 124 | 1.922 | 12.024 | 159 | 13.746 | 9.436 |
| 20 | 11.437 | 8.477 | 55 | 21.265 | 7.384 | 90 | 8.682 | 3.873 | 125 | 10.38 | 1.503 | 160 | 12.822 | 3.398 |
| 21 | 19.271 | 7.169 | 56 | 3.372 | 9.978 | 91 | 2.243 | 7.654 | 126 | 7.321 | 13.727 | 161 | 15.667 | 14.421 |
| 22 | 21.03 | 10.741 | 57 | 18.077 | 8.791 | 92 | 0.604 | 11.515 | 127 | 13.519 | 6.872 | 162 | 15.71 | 12.953 |
| 23 | 11.866 | 8.996 | 58 | 4.21 | 0.086 | 93 | 5.695 | 7.057 | 128 | 6.176 | 13.324 | 163 | 15.412 | 12.931 |
| 24 | 10.166 | 11.665 | 59 | 17.978 | 1.459 | 94 | 5.03 | 8.106 | 129 | 9.66 | 5.297 | 164 | 2.781 | 8.931 |
| 25 | 18.969 | 8.353 | 60 | 3.422 | 12.517 | 95 | 18.969 | 5.034 | 130 | 4.861 | 9.566 | 165 | 8.38 | 10.6 |
| 26 | 17.152 | 13.217 | 61 | 16.104 | 10.836 | 96 | 1.048 | 13.213 | 131 | 11.418 | 7.357 | 166 | 19.011 | 10.965 |
| 27 | 21.93 | 10.551 | 62 | 6.151 | 5.512 | 97 | 1.236 | 5.343 | 132 | 0.162 | 4.057 | 167 | 10.893 | 5.869 |
| 28 | 13.453 | 9.683 | 63 | 15.009 | 8.016 | 98 | 1.87 | 3.063 | 133 | 16.952 | 11.473 | 168 | 14.779 | 10.393 |
| 29 | 5.857 | 4.568 | 64 | 15.882 | 13.858 | 99 | 21.176 | 0.727 | 134 | 21.322 | 12.443 | 169 | 7.691 | 12.847 |
| 30 | 18.483 | 4.434 | 65 | 2.707 | 2.56 | 100 | 19.33 | 3.608 | 135 | 19.887 | 6.726 | 170 | 16.814 | 5.724 |
| 31 | 8.269 | 1.574 | 66 | 18.362 | 1.909 | 101 | 8.869 | 2.101 | 136 | 4.899 | 6.41 | 171 | 0.014 | 7.077 |
| 32 | 14.898 | 12.343 | 67 | 11.374 | 13.8 | 102 | 14.488 | 8.818 | 137 | 10.526 | 5.496 | 172 | 16.457 | 11.046 |
| 33 | 0.194 | 2.246 | 68 | 9.377 | 0.404 | 103 | 20.794 | 2.854 | 138 | 9.117 | 8.085 | 173 | 17.469 | 4.868 |
| 34 | 6.07 | 1.151 | 69 | 20.885 | 0.811 | 104 | 0.049 | 11.046 | 139 | 18.515 | 12.131 | 174 | 15.923 | 5.225 |
| 35 | 12.934 | 9.294 | 70 | 12.09 | 1.909 | 105 | 1.088 | 9.229 | 140 | 9.405 | 0.141 | 175 | 11.85 | 1.181 |

Points used:-

CLAMPING WEDGE FOR SEAT BELT WEBBING HAVING A RANDOM ARRAY OF TEETH

DESCRIPTION

The present invention relates to a retractor for a vehicle safety restraint system and particularly to a web locking retractor in which one or more wedges are caused to clamp a section of safety belt webbing to restrain a vehicle occupant in the event of acceleration or deceleration forces exceeding a predetermined minimum, typically around 0.45 G.

To make the or each wedge more effective in its clamping action it has been suggested to add raised portions to the clamping surfaces, for example individual teeth.

A drawback however with using teeth is the increased wear on the belt webbing material since the fibres of the belt webbing are encouraged by traditional teeth designs to meander between the teeth and the lines of weft and warp tend to be distorted during each clamping movement. Modern web locking retractors are intended to be activated, not only in the event of a crash, but also during high acceleration or deceleration levels such as may be found on fast cornering or sudden braking. Thus modern web locking retractors engage the webbing many times during normal usage. In order to ensure an adequate long life for the webbing, a particularly high quality, high strength webbing must be chosen and this of course can be expensive.

According to one aspect of the present invention there is provided a clamping wedge for a web locking retractor, comprising a clamping surface having a plurality of individual teeth, wherein each individual tooth has its apex perpendicularly above the geometric centre of its base.

According to a second aspect of the invention there is provided a clamping wedge for a web locking retractor comprising a clamping surface having a plurality of individual teeth wherein each individual tooth has a plane of symmetry perpendicular to the plane of the webbing and parallel to the line of the direction of webbing movement. In normal use this plane of symmetry is in a vertical plane. According to a preferred embodiment each individual tooth additionally has a plane of symmetry perpendicular to the plane of the webbing and perpendicular to the line of direction of movement of the webbing.

Each individual tooth may take the form of a many-sided pyramid or a cone. The base of each tooth is preferably formed of a regular polygon or a circle. The most preferred embodiment uses a tooth in the form of a four-sided pyramid with a square base.

According to a third aspect of the present invention there is provided a clamping wedge for a web locking retractor comprising a clamping surface having a plurality of individual teeth arranged thereon in a random array.

The individual teeth may take the form of the first or the second aspect. The array may be completely random or may comprise two parts, one part being the mirror image of the other part. A random array may be formed by placing teeth on the surface in arbitrary positions or may be formed more mathematically by, for example, use of random numbers generated by a computer program in known manner and used to define coordinates as plotting positions for the teeth on the clamping surface, as in x–y positions. Preferably overlapping positions are avoided, either by rejection of any plotted point which causes an overlap or by suitable scaling of the plotting. According to a preferred embodiment, two sets of random numbers are generated and each consecutive random number pair is used as an x–y index to define the position of the next tooth in relation to the position of the previous tooth (rather than by always referring to the first tooth or to some other fixed reference position on the surface). This helps to prevent overlapping teeth.

In a particular preferred embodiment, a random array of teeth is mirrored from one half of the surface to the other half. Preferably two clamping surfaces are used one on each side of the webbing. Each surface has an identical array but they are turned with teeth facing each other. Advantageously positions are avoided in which the apexes of facing teeth would coincide. This may be done by offsetting the mirrored teeth by typically a one tooth spacing.

For a better understanding of the present invention and to show how the same may be carried into effect reference will now be made to the accompanying drawings in which:

FIG. 10 is a table illustrating how random numbers can be used to generate the random array of FIG. 9.

Figure 1:
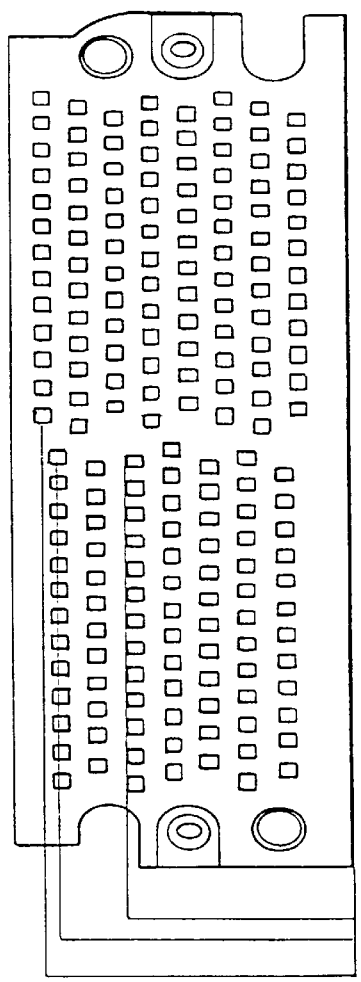
FIG. 1 is a plan view of a web clamping wedge showing an array of clamping teeth according to the present invention.

FIG. 1 illustrates a plan view of the web clamping surface 1 of a clamping wedge 2 showing an array of spaced individual teeth 3. The teeth are arranged in horizontal rows and each succeeding horizontal row is offset by 20° to the immediately preceding row. Other angles would be possible as also would be a geometrically square array of teeth. The pattern is mirrored about the centre line 5 and shifted by a distance equal to half the row separation. In this way the same wedge can function on both sides of the webbing without any teeth coinciding, i.e. without apexes clashing.

Figure 2:
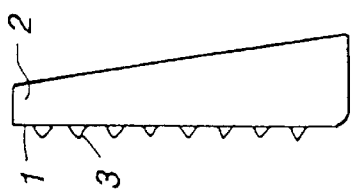
FIGS. 2 and 3 are right and left side views respectively of the wedge of FIG. 1.
Figure 3:
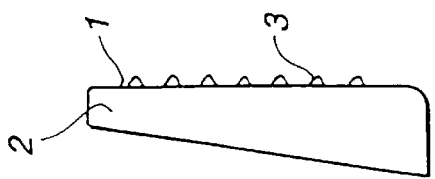

FIGS. 2 and 3 show right- and left-hand side views of the wedge 2 illustrating the teeth 3 in side profile.

Figure 4:
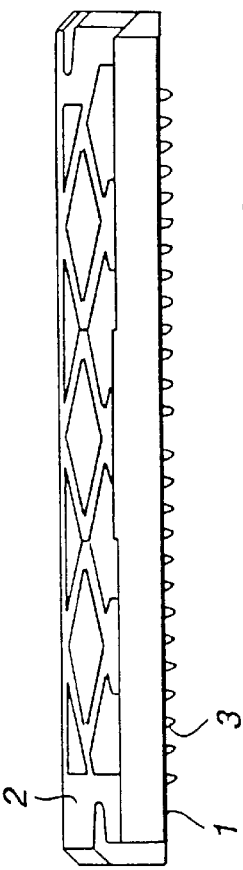
FIG. 4 is a top side view of the wedge of FIG. 1.

FIG. 4 is a top plan view of wedge 2 illustrating the profile of teeth 3 in a direction perpendicular to that of FIGS. 2 and 3.

In the embodiment illustrated in FIGS. 1 to 6 the teeth take the form of four-sided triangles. They have a square base and are symmetrical about vertical and horizontal axes as well as about diagonals of the square base.

The total number of teeth on wedge surface 1 in this embodiment is 185. Their centres are spaced by 1.8 mm in the weft direction, i.e. along a line of teeth and the lines of teeth are 2.0 mm apart, i.e. have a 2.0 warp pitch. The apex of each tooth subtends an angle of 60°.

Figure 5:
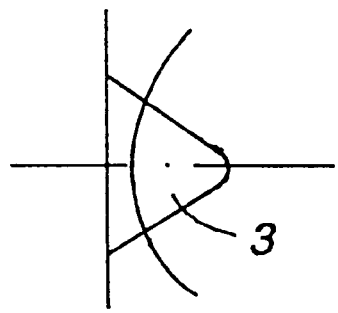
FIGS. 5 and 6 illustrate a tooth of the embodiment of FIG. 1 in more detail.
Figure 6:
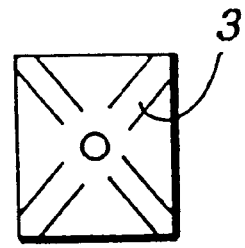

FIG. 5 shows a single tooth in profile and FIG. 6 shows the tooth 3 in plan view.

Figure 7:
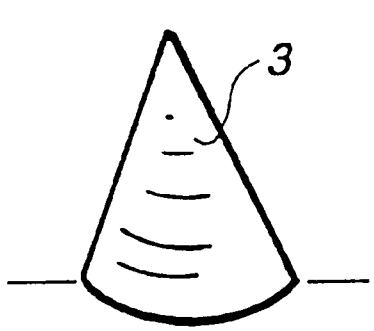
FIGS. 7 and 8 illustrate schematically alternative tooth profiles.
Figure 8:
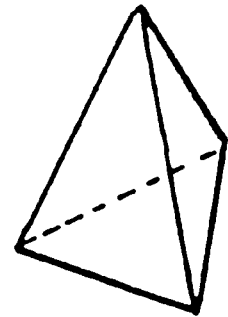

The teeth may equally well have a cone shape as schematically illustrated in FIG. 7 or may in the form of a tetrahedron as schematically illustrated in FIG. 8. Any regular polygon shape for the base of the tooth would be appropriate.

Figure 9:
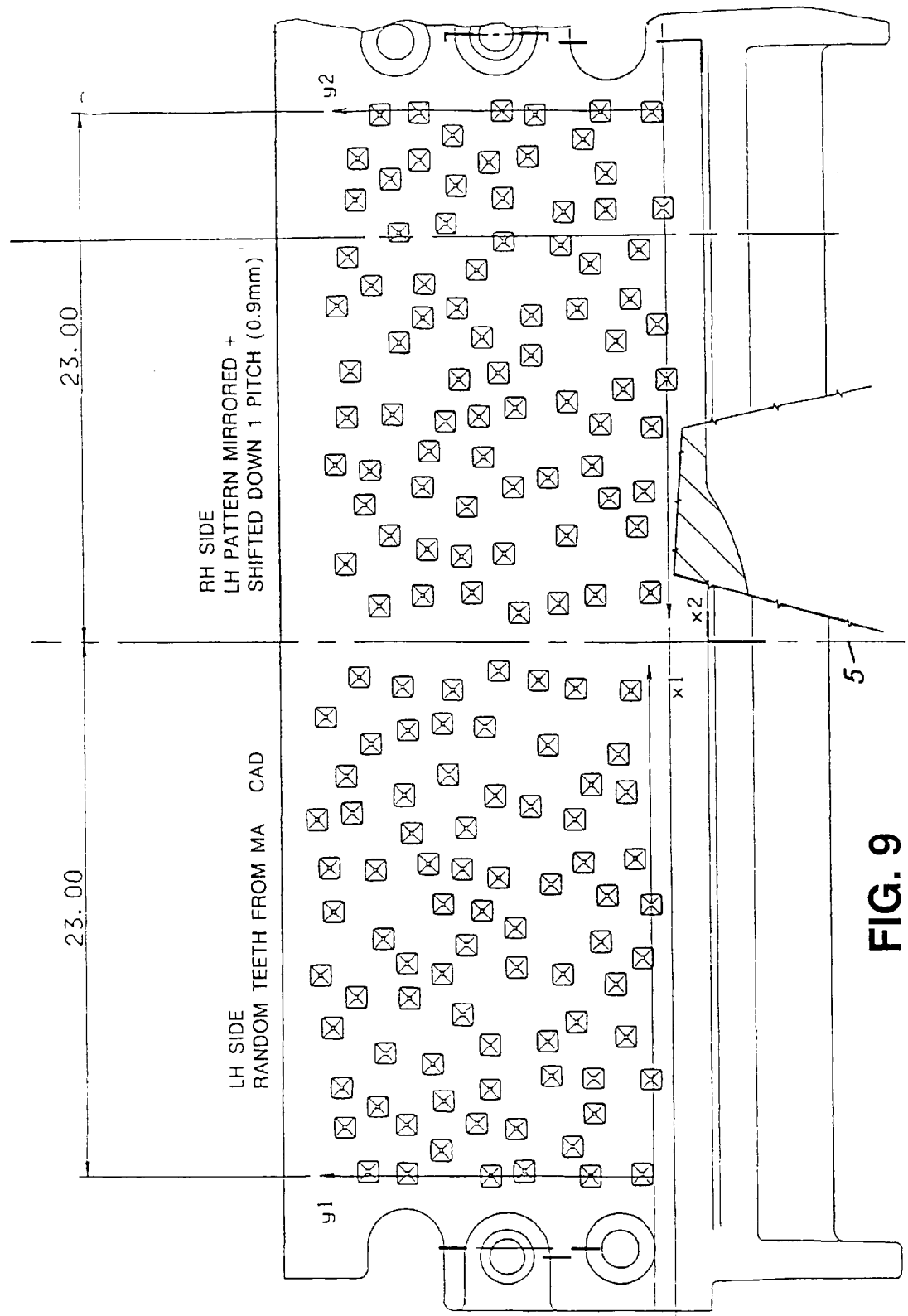
FIG. 9 illustrates a random array of teeth according to the third aspect of the invention.

FIG. 9 illustrates a random array of teeth constructed from a list of random numbers used as x–y indices to plot successive tooth positions in relation to the immediately preceding tooth position. The random pattern is mirrored about the centre line 5 of the wedge surface. It is also dropped or shifted down by a distance such as the width of a tooth, in a similar manner to the arrangement of FIG. 1.

In the array illustrated the shift is of 0.9 mm being the length of one side of the base of a tooth. This enhances the interlocking of the teeth on the wedges on each side of the webbing.

Figure 10:
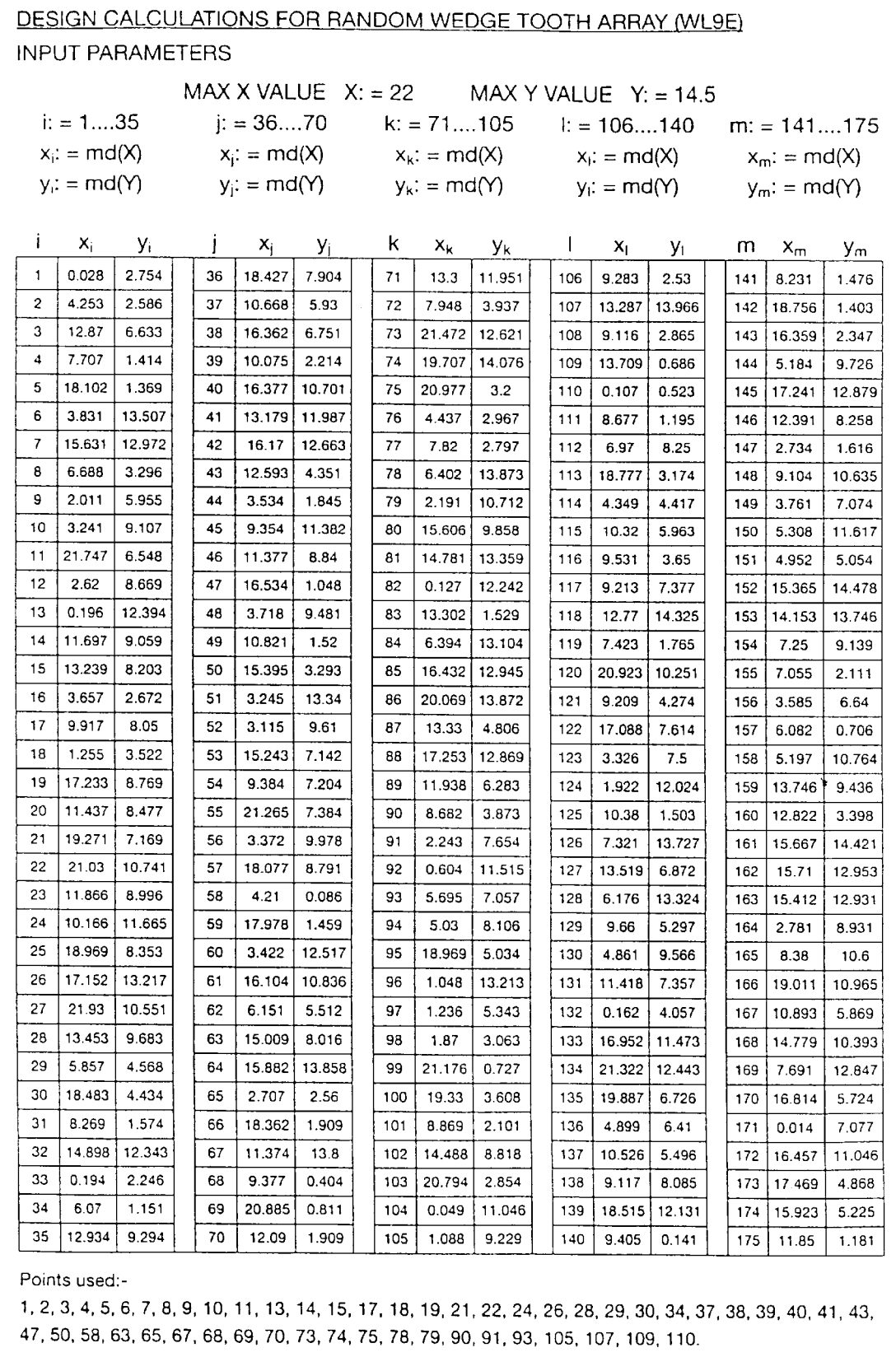

FIG. 10 is a table of random numbers used as the coordinates for the random array of FIG. 9. The random numbers in this case were generated in two sets of 175 on a Math CAD 5.0 plus program (of course any similar program may be used). These were used as coordinates and any that encroached within a circle of diameter 1.5 mm centred on each tooth, were rejected to avoid overlap. A total of 80 tooth points were defined in this way, on the left hand side of the centre line 5 of the wedge surface. This array is mirrored in the right hand side and offset by 1 pitch (0.9 mm).

The identical clamping wedges are preferably used in a weblocking retractor, one on each side of the webbing with teeth facing each other through the webbing thickness. Because of the mirroring and offset, the apexes of facing teeth do not coincide.

Figure 11:
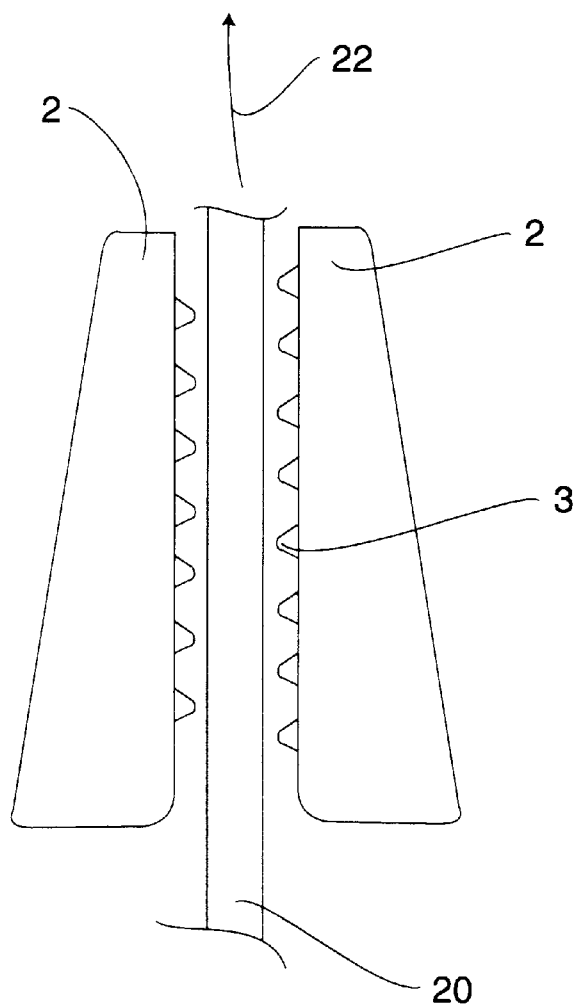
FIG. 11 shows two clamping wedges with webbing therebetween.

FIG. 11 shows two clamping wedges disposed on either side of a seat belt or webbing 20 and also shows the direction of webbing movement (see arrow 22) in relation to the individual teeth 3 of each clamping wedge 2. As can be appreciated, each individual tooth 3 has a plane of symmetry generally perpendicular to the plane of the seat belt webbing and parallel to the direction of webbing movement 22.

What is claimed is:

1. A clamping wedge for seat belt webbing that is movable in a predetermined direction, of movement, relative thereto, the clamping wedge comprising a clamping surface having a plurality of individual teeth arranged in a random array on a part of the surface.

2. A clamping wedge according to claim 1, wherein the surface (1) comprises two parts and the array of teeth (3) on the first part is a mirror image of the array of teeth (3) on the second part.

3. A clamping wedge according to claim 2, wherein the tooth arrays in the first and second parts are offset one from the other.

4. A clamping wedge according to claim 3, wherein the offset comprises one half of a base diameter of each tooth (3).

5. A clamping wedge according to claim 1, wherein each individual tooth (3) has its apex perpendicularly above a geometric centre of a base of the tooth (3).

6. A clamping wedge according to claim 1 wherein each individual tooth (3) has a plane of symmetry perpendicular to a plane of the webbing and parallel to the direction of webbing movement.

7. A clamping wedge according to claim 6, wherein said plane or symmetry is in a vertical plane.

8. A clamping wedge according to claim 7, wherein each individual tooth (3) has a plane of symmetry perpendicular to a plane of the webbing and perpendicular to the direction of movement of the webbing.

9. A clamping wedge according to claim 6, wherein each individual tooth (3) has a plane of symmetry perpendicular to a plane of the webbing and perpendicular to the direction of movement of the webbing.

10. A clamping wedge according to claim 1, wherein each individual tooth (3) takes the form of a many sided pyramid.

11. A clamping wedge according to claim 10, wherein the surface comprises two parts and the array of teeth on the first part is a mirror image of the array of teeth on the second part.

12. A clamping wedge according to claim 10, wherein the tooth arrays in the first and second parts are offset one from the other.

13. A clamping wedge according to claim 1, wherein each individual tooth (3) takes the form of a cone and a base of each tooth is formed of a circle.

14. A clamping wedge according to claim 1 wherein the random array of teeth is on at least a substantial part of the surface.

15. The clamping wedge according to claim 1 wherein x-y coordinates of each tooth in a specific array of teeth on the surface corresponds to paired, randomly generated numbers falling across the surface.

* * * * *